May 2, 1967 P. K. WATSON 3,317,822
METHOD AND APPARATUS FOR MEASUREMENT OF HIGH VOLTAGE
Filed Jan. 15, 1963
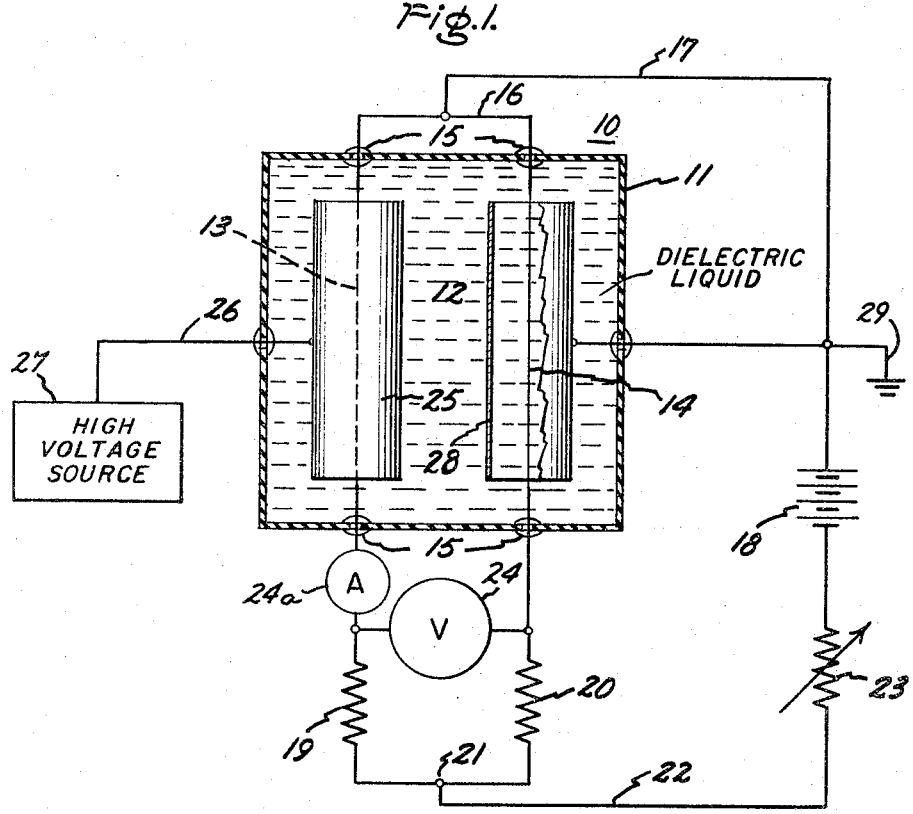
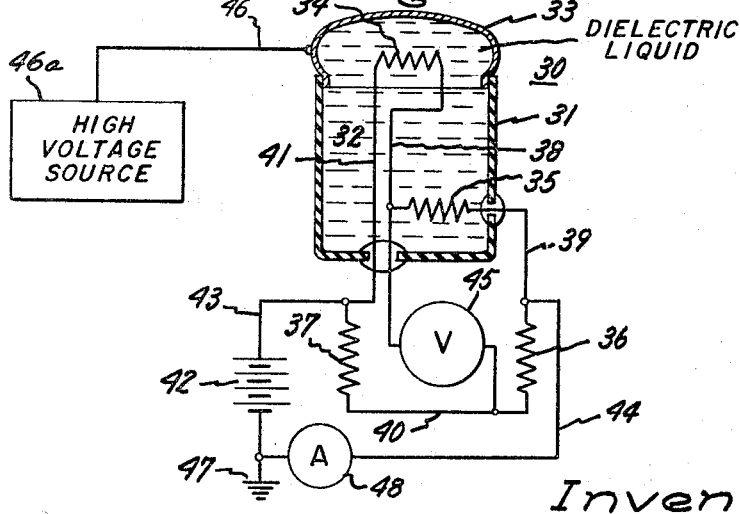
Inventor:
Percy K. Watson,
by James J. Lichiello
His Attorney.

3,317,822
METHOD AND APPARATUS FOR MEASUREMENT OF HIGH VOLTAGE
Percy K. Watson, Birmingham, England, assignor to General Electric Company, a corporation of New York
Filed Jan. 15, 1963, Ser. No. 251,612
5 Claims. (Cl. 324—32)

This invention relates to a high voltage electrostatic type voltmeter and more particularly to a high voltage electrostatic type voltmeter operative on the principle of the change in electrical resistance of an electrical conductor caused by means of heat transfer therefrom in an electrostatic field.

Measurement of voltage usually entails the connection of a voltmeter across a pair of electrical conductors which are at different potentials. Voltmeters, such as the moving coil galvanometer, are standard and well known in the art. These voltmeters utilize a portion of the current flowing in the circuit so that a high degree of accuracy is not attainable unless certain corrections for the current flow through the instrument be made. Electrostatic voltmeters depend on the attractive force which exist between two conducting plates between which a difference of potential exists. In the simplest form, the force of attraction between a stationary and a movable disc is balanced by a calibrated spring. Electrostatic voltmeters are very useful because of their high resistance and low power consumption at low frequencies. They are not used to measure high voltages at frequencies above a megacycle because of the rapid increase of the power loss and the necessary insulation.

Accordingly, it is an object of this invention to provide an improved high voltage voltmeter to obviate the aforementioned problems.

It is another object of this invention to provide an improved electrostatic type high voltage voltmeter.

It is another object of this invention to provide a high voltage voltmeter operative on the change of electrical resistance with heat principle of an electrical conductor.

It is a further object of this invention to provide an improved electrostatic type high voltage voltmeter operable over a wide range of voltages with increased accuracy.

Briefly described, the operation of the high voltage voltmeter of this invention relates to the principle that, when a solid body is in contact with a dielectric fluid which is subjected to an electrostatic field, the rate of heat transfer from the solid body to the fluid increases appreciably. Incorporating this principle, a high voltage voltmeter is presented herein, one embodiment of which includes a galvanometer connected in operative relationship across a pair of electrical conductors, which conductors are located in a dielectric liquid. This dielectric liquid is subjected to a non-uniform electrostatic field imposed by the high voltage source to be measured with the high potential being exerted in the vicinity of one conductor, while the other conductor either is shielded from the aforementioned non-uniform electrostatic field over a considerable portion of the extent thereof or is itself grounded. The change caused in the electrical resistance of the said one conductor by an increase in heat transfer therefrom to the dielectric liquid is registered by the galvanometer and may be used as a measure of the voltage initiating the electrostatic field.

The invention will be better understood when taken in connection with the following description and the drawing in which:

FIG. 1 is a schematic illustration of one preferred form of this invention; and

FIG. 2 is a modification of the voltmeter of FIG. 1.

The operative principle of this invention is the fact that in the non-uniform electrostatic field there is a force proportional to the gradient of the square of the field tending to push regions of low dielectric constant out of the highest field. It is this force which operates on the heated liquid around a hot electrical conductor and thus enhances heat transfer from the electrical conductor to the liquid. In the high voltage voltmeter of the present application, this transfer of heat causes a change in the resistance of the heater electrode as a measure of the applied electrostatic field, because the applied electrostatic field reduces the temperature of the electrode, which accordingly changes the resistance of the electrode.

Referring now to FIG. 1, there is illustrated one preferred embodiment of a high voltage voltmeter 10 in accordance with the practice of this invention. High voltage voltmeter 10 includes a suitable chamber or casing 11 made of non-electrically conducting material, which contains a dielectric liquid for example n-decane 12. Other suitable dielectric liquids include transformer oils, kerosene, chlorinated diphenyls, etc. The liquid in general should be one that is ordinarily electrically non-conductive and of a fairly high boiling point to prevent boiling thereof. A first pair of spaced apart resistance electrodes 13 and 14 are provided in contact with or immersed in decane 12. In one practice of this invention electrodes 13 and 14 were of 0.1 mm diameter nickel wire, and as illustrated in FIG. 1 pass through casing 11 by means of seals 15.

Electrodes 13 and 14 are resistance electrodes or elements in a Wheatstone bridge measuring circuit described as follows. After passing through casing 11 at one side thereof electrodes 13 and 14 are directly connected together or connected together by lead 16. Thereafter a lead 17 connects to lead 16 and to a source of electrical power such as a battery 18. At the other side of the casing 11 electrodes 13 and 14 are connected in series relationship with a second pair of resistance elements 19 and 20 respectively to define four legs of a Wheatstone bridge circuit. These resistances 19 and 20 are directly connected together or connected together by lead 21, and a lead 22 then connects the resistances 19 and 20 through a variable resistor 23 to a battery source of power 18. The four elements 13, 14, 19 and 20 define a loop circuit having two branches in parallel with each other. One branch comprises electrode 13 and resistance 19 connected in series with each other and the other branch comprises electrode 14 and resistance 20 connected in series with each other. The two branches are connected in parallel with each other and in series with battery 18. Spaced apart electrodes 13 and 14 are immersed in, in contact with, or in heat exchange relationship with dielectric liquid 12. Resistances 19 and 20 which are also spaced apart are not in contact with the dielectric liquid 12 and are preferably outside of casing 11. The variable resistor 23 is employed as a sensitivity control for the circuit.

An instrument to measure either voltage or unbalanced current, such as a galvanometer, is connected across electrodes 13 and 14 between the resistances 19 and 20 and the portion of electrodes 13 and 14 in casing 11. Preferably a properly calibrated voltmeter 24 is employed and its location is best described as being connected transversely across the defined two branches of the loop circuit intermediate thereof to separate electrodes 13 and 14 as a pair from resistances 19 and 20 as a pair. Voltmeter 24 will measure any difference in potential between electrodes 13 and 14. Ammeter 24a may be provided to measure the current in electrode 13. There is thus provided a Wheatstone bridge type circuit including the pair of electrodes 13 and 14, and the pair of resistances 19 and 20, with the pair of electrodes 13, 14 connected in parallel with each other and in series with a source of electrical power. The pair of resistances 19 and 20 are similarly connected. Voltmeter 24 measures the potential difference across electrodes 13 and 14 at the position shown. The bridge circuit will indicate differences in voltage caused by unbalanced current flow through conductors 13 and 14.

The unbalanced current condition is caused by differences or changes in the electrical resistance of electrodes 13 and 14 relative to each other resulting from the aforementioned heat transfer or temperature variation. For example, when the circuit is balanced current flow through electrodes 13 and 14 is equal. These electrodes being also electrical resistors are subjected to heating because of current flow. Therefore, when heat transfer between one electrode for example electrode 13, and liquid 12 is greatly increased, then the temperature and resistance of electrode 13 is also reduced permitting an unbalance in current flow through the electrodes 13 and 14, i.e., more current flows through the colder electrode 13. The voltmeter 24 thus will indicate the difference in potential between electrodes 13 and 14. In this invention the increase in heat transfer between an electrical conductor and the liquid 12 to cause the unbalanced current flow condition, is caused by an electrostatic field and the galvanometer thus will indicate the strength of the field as proportional to the impressed voltage. Further, it has been discovered that to produce this phenomenon the electrostatic field can be either a unidirectional field impressed on the liquid from a positive or a negative electrode or else may originate from a source of alternating voltage. In either case there is an increase in heat transfer from the heated wire electrode to the liquid.

The electrostatic field is provided in FIG. 1 in one form as follows. An electrode in the form of a hollow electrically conductive cylinder 25 of a suitable material such as copper, nickel, etc., surrounds a portion of electrode 13. In one example cylinder 25 was nickel of 3 cm. diameter and 10 cm. length. Cylinder 25 is connected to the high voltage source, for example by means of lead 26, making connection to the high voltage source indicated as 27. Electrode 14 is also surrounded by an electrically conductive cylinder 28, similar in all respects to cylinder 25, and includes a suitable ground connection 29. With the establishment of a non-uniform electrostatic field between cylinder 25 and electrode 13, there is an increase in the rate of heat transfer between electrode 13 and liquid 12. Thus, electrode 13 is effectively cooled, its resistance is lowered and more current flows through electrode 13 than through electrode 14. This unbalanced condition is indicated by the voltmeter 24 which is calibrated to provide a reading in volts of the voltage source causing the unbalanced condition. Alternatively the voltmeter 24 can be used as a null detector, if balance of the Wheatstone bridge is achieved by adjusting resistance 19. Resistance 19 is then calibrated to provide a reading in volts of the high voltage source 27.

In the embodiment as described, each cylinder and electrode assembly, i.e. 25 and 13 or 28 and 14, may be referred to as a coaxial cell. The components of each coaxial cell must be spaced apart sufficiently so that no breakdown of the dielectric 12 occurs. It is not necessary that both cells be positioned within the same casing of liquid. Electrodes 25 or 28 may take forms other than being a complete cylinder, for example, a part of a cylinder or a flat plate, etc., positioned adjacent electrodes 13 and 14 may be used. Electrodes 13 and 14 are thus referred to as bridge electrodes and electrodes 25 and 28 may be referred to as the field electrodes. While it is understood that one electrode may serve as a bridge electrode and an electrostatic field electrode, in the preferred form of this invention the electrodes are separate.

A modification of the voltmeter of this invention is illustrated in FIG. 2. Referring now to FIG. 2, a modified form of a voltmeter 30 is shown. Voltmeter 30 includes a casing 31 made of non-electrically conducting material to contain a suitable dielectric 32 and a high voltage cover 33. The Wheatstone bridge circuit includes four electrical resistance elements or bridge electrodes 34, 35, 36 and 37 with electrodes 34 and 35 being positioned in spaced apart relationship within the casing 31, and the further pair of resistances 36 and 37 being positioned out of the casing, i.e., out of the dielectric liquid 32. Suitable electrical leads 38, 39, 40 and 41 connect the electrical resistance elements 34, 35, 36 and 37 in series loop relationship with leads 39 and 41 being those leads which connect the interior resistance elements 34 and 35 to the exterior resistance elements 36 and 37. The power supply for the Wheatstone bridge circuit is denoted as a battery 42 which is connected by means of leads 43 and 44 to leads 39 and 41, respectively. When an unbalanced condition exists in the Wheatstone bridge circuit it is measured by means of voltmeter 45 which is connected across electrode 35 and resistance 36, i.e., from lead 38 to lead 40. More specifically, the voltmeter 45 is connected from between electrodes 34 and 35 to between electrodes 36 and 37 thereby differing from the voltmeter 24 connection as in FIG. 1, and also utilizes a different power source (battery 42) connection than that of FIG. 1. The principle of the operation of the modification of FIG. 2 is similar to that of FIG. 1. For example, the high voltage to be measured is connected to voltmeter 30 by means of lead 46 connecting the high voltage source 46a to electrode cover 33. A ground connection 47 is provided for connection of the circuit to ground potential. The same field electrode arrangement as described for FIG. 1 may also be employed if desirable. However, lead 46 may be removed and the voltmeter of FIG. 2 utilized as a probe type voltmeter where cover 33 may be positioned in contact with or in close proximity to the high voltage source to be measured. The heat transfer principle of an electrode in an electrostatic field, as discussed relative to FIG. 1, causes heat to be transferred more rapidly from resistance element 34 to the dielectric 32. More current will then flow through resistance elements 34 and 35 rather than through resistance elements 36 and 37. Thus, voltmeter 45 will indicate a greater potential difference between the circuit branches, i.e., that branch including resistance elements 34 and 37, and that branch including resistance elements 35 and 36. This potential difference is directly proportional to the high voltage source to be measured through the heat transfer principle.

A voltmeter as described will measure very high voltages with the advantages of being applicable for direct connection to the line without use of coupling capacitors, transformers, etc. The described voltmeter not only removes no power from the source of high voltage to be measured, but also removes but a fraction of power from its own low power circuit.

While a specific method and apparatus in accordance with this invention is described and shown, it is not intended that the invention be limited to the particular description nor to the particular configurations illustrated, and it is intended by the appended claims to cover all modifications within the spirit and scope of this invention.

What I claim as new and desire to secure by Letters Patent of the United States is:

1. A method of measuring the voltage of a high voltage source, which comprises:
 (a) measuring the flow of electric charge through an electrical conductor, said conductor being in heat exchange relationship with a non-flowing dielectric liquid,
 (b) imposing a non-uniform electrostatic field in said dielectric liquid in the vicinity of said conductor with said high voltage source whereby the rate of transfer of heat from said conductor to said dielectric medium is changed, and
(c) measuring the flow of electric charge through said conductor after the imposition of the electrostatic field in order to detect the change in flow of electric charge resulting therefrom and thereby determine the voltage of said voltage source.

2. A method of measuring the voltage of a high voltage source which comprises:
(a) applying equal electric currents to each of a pair of spaced electrical conductors in contact with a fully enclosed non-flowing dielectric liquid,
(b) impressing a non-uniform electrostatic field upon said dielectric liquid with said high voltage source in the region surrounding one only of said conductors whereby there occurs an increase in the rate of heat transfer from said one of said conductors to said dielectric liquid, and
(c) measuring the difference in electric current in said one of said conductors relative to the other of said conductors to determine the voltage causing said electrostatic field.

3. An electrical measuring device for measuring the voltage of a high voltage source comprising in combination:
(a) a casing of non-electrically conducting material,
(b) a non-flowing dielectric liquid contained in said casing,
(c) a first electrode in heat exchange relationship with said dielectric liquid,
(d) a field electrode spaced from said first electrode with dielectric liquid disposed therebetween,
  (1) said field electrode being adapted to receive an electrostatic charge and, upon receiving such electrostatic charge, to impose a non-uniform electrostatic field on said dielectric liquid, whereby the rate of heat transfer between said first electrode and said dielectric liquid is altered, and
(e) means electrically connected to said first electrode to supply electric current to said first electrode and to measure the change in electric current resulting after the imposition of the electrostatic field whereby the voltage of the source of high voltage from which said field electrode receives an electrostatic charge may be determined.

4. An electrical measuring device for measuring the voltage of a high voltage source comprising in combination:
(a) a casing of non-electrically conducting material,
(b) a dielectric liquid contained in said casing in non-flowing condition,
(c) a resistance electrode in heat exchange relationship with said dielectric liquid,
(d) a field electrode spaced from said resistance electrode with dielectric liquid disposed therebetween,
(e) a source of high voltage connected to said field electrode and electrically insulated from said casing to subject said dielectric liquid to a non-uniform electrostatic field whereby the rate of heat transfer from said resistance electrode to said dielectric liquid is altered thereby changing the electrical resistance of said resistance electrode,
(f) three resistance elements,
(g) means for measuring any change in the amount of current in said resistance electrode, and
(h) a source of relatively low electrical power,
  (1) said three resistance elements, said resistance electrode, said measuring means and said low power source being connected in a Wheatstone bridge arrangement, whereby indications by said measuring means of imbalance in said Wheatstone bridge arrangement may be used as a measure of the voltage of said high voltage source.

5. A voltmeter for measuring the voltage of a high voltage source comprising in combination:
(a) a casing of non-electrically conducting material,
(b) a dielectric liquid confined in said casing,
(c) two spaced apart resistance electrodes located in said casing in contact with said dielectric liquid,
(d) two resistance elements out of contact with said dielectric liquid,
(e) electrical connecting means connecting said two resistance electrodes and said two resistance elements in a Wheatstone bridge circuit,
(f) a voltmeter connected transversely of said Wheatstone bridge circuit separating said resistance electrodes and resistance elements into pairs,
(g) means connecting said source of low electrical power to said Wheatstone bridge circuit to cause heating of said resistance electrodes,
  (1) said Wheatstone bridge circuit being connected to ground,
(h) a first field electrode located adjacent a first of said resistance electrodes and being adapted to be connected to a high voltage source to be measured whereby a non-uniform electrostatic field may be impressed on the dielectric liquid disposed between said first field electrode and said first of said resistance electrodes, and
(i) a second field electrode located adjacent the other of said resistance electrodes and being adapted to be connected to ground potential to insure a region of substantially reduced electrostatic field around said second of said resistance electrodes relative to the electrostatic field around said first field electrode whereby any difference in current in said resistance electrodes resulting from the impression of said electrostatic field is indicated by said voltmeter and may be used as a measure of the voltage of said high voltage source.

References Cited by the Examiner
UNITED STATES PATENTS

| | | | |
|---|---|---|---|
| 2,605,377 | 7/1952 | Kaehni et al. | 219—9 |
| 2,637,408 | 5/1953 | Yadoff | 73—204 X |
| 3,063,010 | 11/1962 | Richardson | 324—62 X |

WALTER L. CARLSON, *Primary Examiner.*

FREDERICK M. STRADER, *Examiner.*

C. F. ROBERTS, *Assistant Examiner.*